(12) United States Patent
Wu

(10) Patent No.: US 6,901,981 B2
(45) Date of Patent: Jun. 7, 2005

(54) TIRE STRUCTURE INCLUDING AUXILIARY INNER TIRE

(76) Inventor: Wei-Min Wu, No. 217, An-Fu Street, Tainan City (TW)

( * ) Notice: Subject to any disclaimer, the term of this patent is extended or adjusted under 35 U.S.C. 154(b) by 198 days.

(21) Appl. No.: 10/347,418

(22) Filed: Jan. 21, 2003

(65) Prior Publication Data

US 2004/0140031 A1 Jul. 22, 2004

(51) Int. Cl.[7] .......................... B60C 17/00; B60C 17/01; B60C 17/04; B60C 17/06; B60C 5/22
(52) U.S. Cl. .................. 152/157; 152/340.1; 152/341.1
(58) Field of Search ................................ 152/157, 158, 152/339.1–342.1

(56) References Cited

U.S. PATENT DOCUMENTS 768,684 A * 8/1904 Parmley ................. 152/342.1
4,177,848 A * 12/1979 Van der Burg ............. 152/158
4,183,388 A * 1/1980 Cassidy ...................... 152/158

FOREIGN PATENT DOCUMENTS

EP  0 695 651 A1 * 2/1996

* cited by examiner

Primary Examiner—Adrienne C. Johnstone
(74) Attorney, Agent, or Firm—Bacon & Thomas

(57) ABSTRACT

In the present invention, an outer tire is supported and positioned by an auxiliary inner tire such that air can be pumped into the space between the inner and outer tires. When there is a flat tire or leakage, the outer tire is supported by the inner tire and still has an appropriate support to the car, and thus the outer tire will not be compressed completely or grinded by the rim of the wheel, so that the tire will not be damaged easily and the auxiliary inner tire can continue running for a short time.

4 Claims, 3 Drawing Sheets

TIRE STRUCTURE INCLUDING AUXILIARY INNER TIRE

BACKGROUND OF THE INVENTION

1. Field of the Invention

This invention relates to a tire structure, more particularly to a tire structure having an auxiliary inner tire installed in a conventional outer tire, such that the vehicle still maintains appropriate support from the tire when there is a flat tire or leakage, and the auxiliary tire can continue running for a short time, so that the tire will not be damaged easily.

2. Description of the Related Art

In general, a regular car tire is made of a rubber material, and the conventional tire generally has an outer tire and an inner tire. Many vehicles nowadays omit the inner tire and only use a stronger outer tire with steel wire or wear-resisting fiber instead for the high-speed application. Take the tire as shown in FIG. 1 for example; the tire 1 of this kind usually comprises a wheel 12 with a latch edge 11, and an outer tire 13 directly mounted onto the outer rim of the wheel 12 and secured to the latch edge 11 of the wheel 12 to define an enclosed space 14 between the outer tire 23 and the wheel 12. Air is pumped into the enclosed space 14 through an air nozzle 15, so that the outer tire 13 is inflated and can support the load of the car for its running.

However, the car is driven on the road, and a regular tire is compressed as shown in FIG. 2. The bottom edge of the outer tire 13 attaches the surface of the ground. It is common to have a flat tire or leakage when a sharp substance probes through the tire. When the tire of this sort leaks, the outer tire 13 will be compressed by the weight and loading of the car as shown in FIG. 3, and the air in the tire will be leaked completely and the tire is flatted in no time, which will cause the driver to lose control of the car and it is very dangerous. If the driver continues driving, the outer tire 13 will be grinded by the latch edge 11 of the wheel 12, or worn out by the latch edge 11 of the wheel 12. It will cause leakage easily even after the tire is changed because the enclosed space 14 is no longer in good condition. Therefore, it is better to stop the car immediately for the situation like this. If there is no spare tire available at hand, or the car cannot be stopped immediately, then the outer tire 13 or the wheel 12 may be damaged or may even cause accidents.

BRIEF SUMMARY OF THE INVENTION

A tire structure of the invention comprises:

an outer tire made of a flexible material, installed on the rim of a wheel, and secured on the latch edge of the wheel thereby an enclosed space being defined between the outer tire and the wheel;

an auxiliary tire substantially in an annular shape, accommodating the inner space of the outer tire and the diameter of an inner opening of the auxiliary inner tire being larger than the external diameter of the middle section of the wheel and the inner opening and the middle section of the wheel keeping an annular gap between thereof;

a support tire being a flexible annular tube installed onto the outer rim at the middle section of the wheel and the inner opening of the auxiliary inner tire thereby air being pumped into the space enclosed by the support tire and the space enclosed by the outer tire and the support tire pressing the inner tire against the inner edge of the outer tire, the outer tire being supported by the support tire and having appropriate support to hold a car during a flat tire or leakage; the support tire being capable of not being compressed completely and not damaged by the latch edge of the wheel, so that the time not being damaged easily and continuing its running for a short time.

BRIEF DESCRIPTION OF THE DRAWINGS

Other features and advantages of the present invention will become apparent in the following detailed description of the preferred embodiments with reference to the accompanying drawings, in which.

DETAILED DESCRIPTION OF THE PREFERRED EMBODIMENTS

Figure 1:
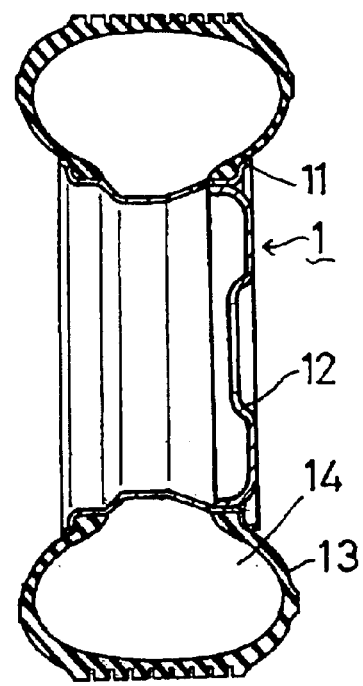
FIG. 1 is an illustrative diagram of a prior art tire structure.
Figure 2:
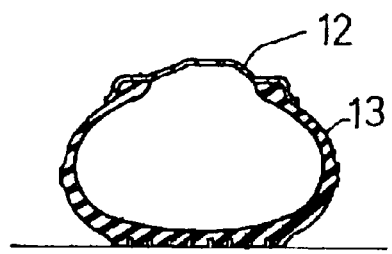
FIG. 2 is an illustrative diagram of a prior art tire having a contact with the ground surface under normal condition.
Figure 3:
FIG. 3 is an illustrative diagram of a prior art tire having a flat tire.

In the detailed description of the preferred embodiments, it should be noted that like elements are indicated by the same reference numerals throughout the disclosure.

Figure 4:
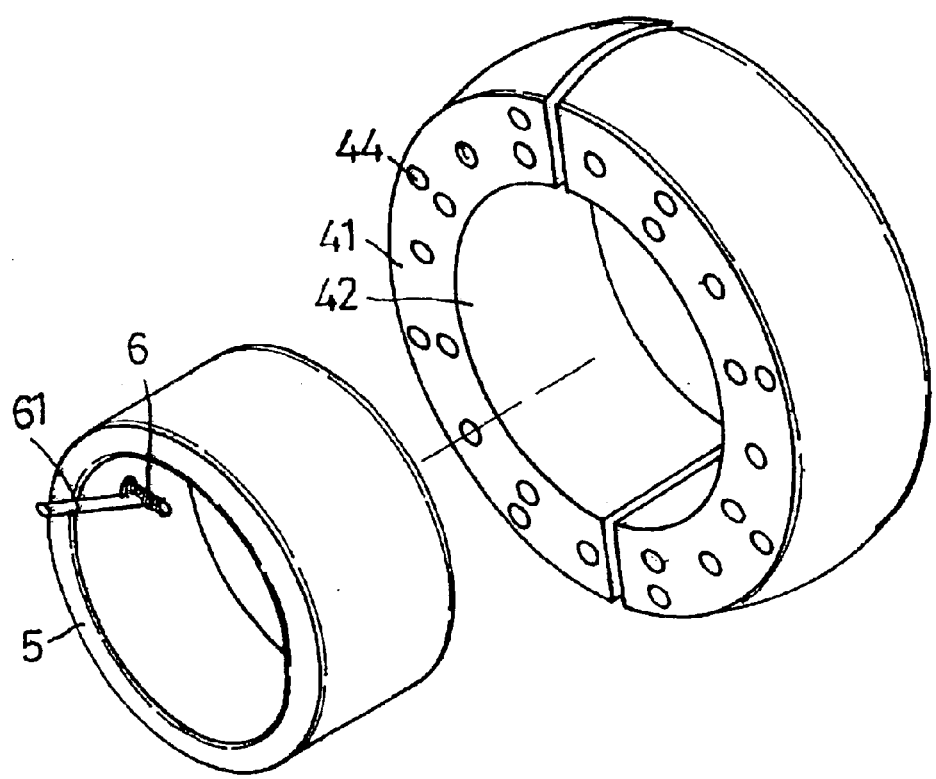
FIG. 4 is a diagram of the disassembled structure of the inner tire and the support tire of a preferred embodiment of the present invention.
Figure 5:
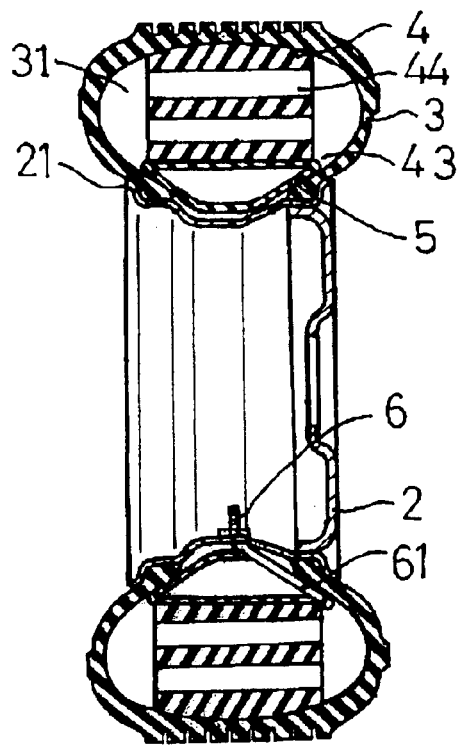
FIG. 5 is a cross-sectional diagram of the tire structure of a preferred embodiment of the present invention.

Please refer to FIGS. 4 and 5 for a tire structure (taking a tire structure for cars for example) in accordance with a preferred embodiment of the present invention. The present invention is characterized in that the tire is applicable for all kinds of cars, and its structure comprises an outer tire 3, installed on a wheel 2, having an inner tire 4 and a support tire 5; wherein the outer tire 3 is the same as a regular tire for cars, made of a flexible material, and the outer tire is also mounted onto the outer rim of the wheel 2 and secured to a latch edge 21 of the wheel 2, such that an enclosed space 31 is defined by the outer tire 3 and a wheel 2; after the air is pumped into such space 31 through an air nozzle 6, the outer tire 3 is inflated to carry the load for the driving, an inner tire 4, having a structure as shown in FIG. 4, substantially comprised of two semi-circular pads 41, and a circular space enclosed by these semi-circular pads is disposed in the space 31 of the outer tire 3, and the diameter of an inner opening 42 is larger than the external diameter of the middle section 21 of the wheel 2; therefore, when the inner tire 4 is accommodated into the space 31 of the outer tire 3, an annular gap is maintained between the inner opening 42 and the middle section 21 of the wheel 2. The inner tire 4 is made of a flexible material, having a relatively high hardness and comprising a plurality of through holes 44 on both lateral sides of the inner tire 4, so that the inner tire 4 can have a lighter weight while the air in outer tire 3 on both sides of the inner tire 4 are interconnected.

The support tire is a flexible tube similar to the inner tire of a regular tire, being mounted on the outer rim at the middle section 21 of the wheel 2 in the inner opening 41 of the inner tire 4, and comprising an air nozzle 6 protruded from the inner rim of the wheel 2, and the air nozzle 6 has a splitter 61.

In practical application, the wheel 2 is mounted onto the outer rim at the middle section 21 of the support tire 5, the inner tire 4 comprised of two corresponding semi-circular pads 41 is mounted into the space 31 of the outer tire 3, and then the outer 3 containing the inner tire 4 is mounted onto the outer rim of the wheel 2, and secured to the latch edge 21 of the wheel 2 to define an enclosed space 31 between the outer tire 3 and the wheel 2. The inner tire in the outer tire 3 is mounted onto the outer rim of the support tire 5, and the air nozzle 6 is disposed on the support tire 5 to control the air from entering or exiting the support tire 5, and its splitter 61 is protruded from the unblocked space 21 of the outer tire 3. After air is pumped into the support tire 5 through the air nozzle 6, the support tire 5 will be inflated to press the pad 41 so that the circular outer rim of the pad 41 presses against the inner edge of the outer tire 3 for the positioning. In the meantime, since the air is pumped into the outer tire 3 through the splitter 61 of the air nozzle 6, the air can fill the space 31 through the through holes 44 on the inner tire 4 to inflate the outer tire 5 and carry the car load for its running. The air nozzle 6 can simultaneously pump air into the support tire 5 and the space 31, or a switch is set on the air nozzle 6 to control the air to be pumped into the support tire 5 or the space 31 separately.

Figure 6:
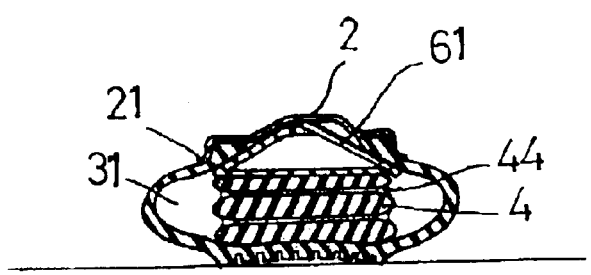
FIG. 6 is a cross-sectional diagram of the tire structure of a preferred embodiment of the present invention where there is a flat tire or leakage.

When there is a flat tire or leakage, the design of tire structure according to a preferred embodiment of the present invention may be compressed due to the air in the space 31 of the outer tire 3 is leaked out, but the space 31 itself possesses an appropriate hardness and the flexible inner tire 4 is supported and positioned by the support tire 5, therefore the outer tire 3 is still supported by the inner tire 4 as shown in FIG. 6 and provide an appropriate support to the car. The outer tire 3 will not be compressed completely or cause loss of control to the car or endanger the driving. The outer tire 3 will not be grinded by the latch edge 21 of the wheel 2, or damage the tire, so that the auxiliary tire can continue running for a short time and allow the driver to pull over for replacing a tire or seek for maintenance services.

While the present invention has been described in connection with what is considered the most practical and preferred embodiment, it is understood that the invention is not limited to the disclosed embodiments but is intended to cover various arrangements included within the spirit and scope of the broadest interpretation and equivalent arrangements.

What is claimed is:

1. A tire structure, comprising of:

an outer tire, made of a flexible material, installed on the rim of a wheel, and secured on the latch edge of the wheel, thereby an enclosed space being defined between the outer tire and the wheel;

an auxiliary inner tire, substantially in an annular shape, accommodating the inner space of the outer tire, and the diameter of an inner opening of the auxiliary inner tire being larger than the external diameter of the middle section of the wheel, and the inner opening and the middle section of the wheel keeping an annular gap between thereof;

a support tire, being a flexible annular tube installed onto the outer rim at the middle section of the wheel in the inner opening of the auxiliary inner tire; thereby air being pumped into the space enclosed by the support tire and the space enclosed by the outer tire and the support tire pressing the inner tire against the inner edge of the outer tire, the outer tire being supported by the support tire and having appropriate support to hold a car during a flat tire or leakage; the support tire being capable of not be compressed completely and not damaged by the latch edge of the wheel, so that the tire being not damaged easily and continuing its running for a short time.

2. A tire structure as claimed in claim 1, wherein said inner tire is made of a flexible material, and comprises a plurality of through holes on both lateral sides of the inner tire.

3. A tire structure as claimed in claim 2, wherein said inner tire is comprised of two corresponding semi-circular pads.

4. A tire structure as claimed in claim 1, wherein said support tire comprises an air nozzle protruded from the inner rim of the wheel and said air nozzle has a splitter.

* * * * *